(12) United States Patent
Casal Kulzer

(10) Patent No.: US 7,588,019 B2
(45) Date of Patent: Sep. 15, 2009

(54) PROCEDURE TO OPERATE AN INTERNAL COMBUSTION ENGINE

(75) Inventor: Andre F. Casal Kulzer, Boeblingen (DE)

(73) Assignee: Robert Bosch GmbH (DE)

( * ) Notice: Subject to any disclaimer, the term of this patent is extended or adjusted under 35 U.S.C. 154(b) by 88 days.

(21) Appl. No.: 11/728,416

(22) Filed: Mar. 26, 2007

(65) Prior Publication Data

US 2007/0227517 A1     Oct. 4, 2007

(30) Foreign Application Priority Data

Mar. 31, 2006   (DE)   .................... 10 2006 014 996

(51) Int. Cl.
  *F02M 25/07*     (2006.01)
  *F02B 47/08*     (2006.01)
(52) U.S. Cl. .............. 123/568.14; 123/316; 123/568.21
(58) Field of Classification Search ................. 123/295, 123/299, 305, 568.11, 568.21, 568.31
   See application file for complete search history.

(56) References Cited

U.S. PATENT DOCUMENTS

| | | | |
|---|---|---|---|
| 6,178,933 B1 * | 1/2001 | Lavy | .......................... 123/58.8 |
| 6,260,520 B1 | 7/2001 | Van Reatherford | |
| 6,354,264 B1 * | 3/2002 | Iwakiri et al. | ................ 123/305 |
| 6,390,054 B1 | 5/2002 | Yang | |
| 6,390,057 B2 * | 5/2002 | Yoshizawa et al. | .......... 123/295 |
| 6,725,829 B2 * | 4/2004 | Kataoka et al. | ............. 123/299 |
| 6,772,585 B2 * | 8/2004 | Iihoshi et al. | ................. 60/277 |
| 6,848,435 B2 * | 2/2005 | Kitamura et al. | ....... 123/568.31 |
| 6,964,256 B2 * | 11/2005 | Kataoka et al. | ............. 123/295 |
| 7,383,118 B2 * | 6/2008 | Imai et al. | .................... 701/104 |
| 2007/0157604 A1 * | 7/2007 | Kakuya et al. | ................ 60/285 |

FOREIGN PATENT DOCUMENTS

| | | |
|---|---|---|
| DE | 199 27 479 | 12/1999 |
| DE | 101 27 205 | 9/2002 |
| DE | 101 34 644 | 2/2003 |
| WO | WO 98/10179 | 3/1998 |

* cited by examiner

*Primary Examiner*—Stephen K. Cronin
*Assistant Examiner*—Johnny H. Hoang
(74) *Attorney, Agent, or Firm*—Merchant & Gould P.C.

(57) ABSTRACT

Methods and devices of operating an internal combustion engine, especially a gasoline engine with direct gasoline injection, in a controlled self-ignition. The internal combustion engine includes a combustion chamber, at least one intake valve and at least one exhaust valve, whose opening times are changeable. The internal combustion engine also includes an adjustable exhaust gas recirculation and a gas mixture capable of ignition, which contains the residual gas, which is compressed in the combustion chamber during a compression stroke, whereby the gas mixture self-ignites toward the end of the compression stroke. The residual gas moves into, respectively remains in, the combustion chamber by using internal and external exhaust gas recirculation.

4 Claims, 2 Drawing Sheets

Figure 1:
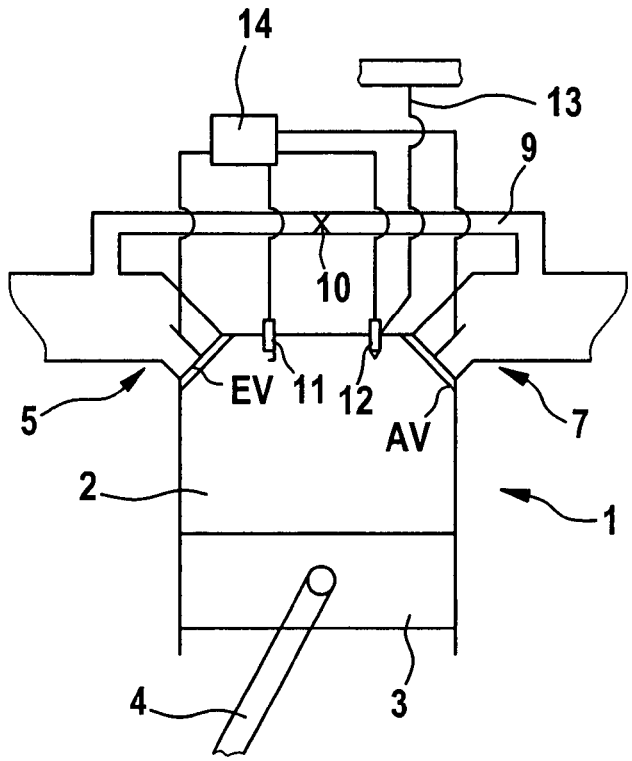

Fig. 3.1 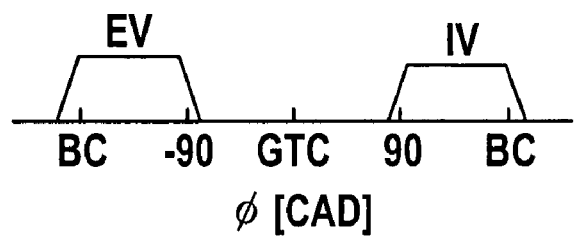
Fig. 3.2 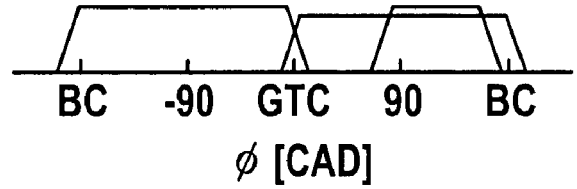
Fig. 3.3 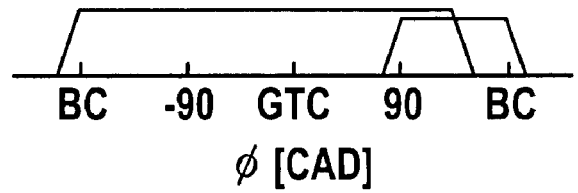
Fig. 3.4 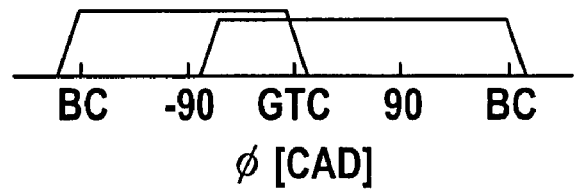

PROCEDURE TO OPERATE AN INTERNAL COMBUSTION ENGINE

The invention at hand concerns a procedure to operate an internal combustion engine, especially a gasoline engine with direct gasoline injection, in a controlled self-ignition. The invention concerns moreover a control unit to implement the procedure.

During operation of an internal combustion engine in the HCCI-mode (Homogenous Charge Compression Ignition), which is also sometimes referred to as CAI (Controlled Auto Ignition), ATAC (Active Thermo Atmosphere Combustion) or TS (Toyota Soken), the ignition of the air/fuel mixture occurs not by externally-supplied ignition but by controlled self-ignition. The HCCI-combustion process can, for example, be induced by a high proportion of residual gases and/or by a high compression and/or a high intake air temperature. A requirement for the self-ignition is a sufficiently high energy level in the cylinder. In internal combustion engines driven in the HCCI mode, which can include gasoline as well as diesel engines, are known, for example, U.S. Pat. Nos. 6,260,520, 6,390,054, German patent DE 199 27 479 and WO 98/10179.

The HCCI-combustion has in comparison to a conventional combustion with an externally-supplied ignition the advantage of a reduced fuel consumption and fewer toxic emissions. However, the closed-loop control of the combustion process and especially the control of the self-ignition of the mixture are not easy. It requires a closed-loop control of the control variables influencing the combustion process. These variables include, for example, the fuel injection (injection amount, respectively the ignition timing and duration), internal or external exhaust gas recirculation, intake and exhaust valves (variable valve control), exhaust gas backpressure (exhaust gas butterfly), if need be an ignition support, intake air temperature, fuel quality and compression ratio (in internal combustion engines with a variable compression ratio).

Approaches to generate a gas-air-mixture batch capable of self-ignition are known from the state of the art for internal combustion engines with an intake manifold injection. In these approaches, a gasoline-air-mixture is drawn in by the piston of the internal combustion engine, and with inclusion of additional steps, which serve to heat up the mixture in the combustion chamber, the mixture is brought to self-ignition.

The following are known as additional steps to heat up the mixture:

1. Variation of the filling of the combustion chamber by way of a variable valve drive. From a set amount of air, which can be influenced by the opening times of the intake valves, the compromised gasoline-air-mixture heats itself up. This step has, however, lift to lift dispersions of the respective individual cylinders as well as deviations among the individual cylinders of an internal combustion engine. Moreover, the onsets of combustion of each of the working cycles and of the individual cylinders can only be controlled with difficulty.
2. High exhaust gas recirculation rates. By recirculation of hot exhaust gases into the combustion chamber, the temperature of the fuel-combustion air-mixture can be significantly elevated before the onset of combustion. The actual combustion temperature during the combustion of the gasoline-air-mixture is, however, reduced by the exhaust gas recirculation, because the oxygen content in the combustion chamber is reduced by the exhaust gas. In so doing, the nitrogen oxide emissions are reduced. The exhaust gas serves as an inert gas, through which the temperature of the combustion air is elevated and which is located in the combustion chamber during combustion. It (the exhaust gas) is, however, hardly involved in the actual combustible reaction. The disadvantage of this step is that the appropriate amount of exhaust gas can only be controlled with difficulty. It concerns an inert system, which has lift to lift dispersions and an uneven distribution to all of the combustion chambers of all of the cylinders.
3. Supercharging of the combustion air. By way of supercharging, the combustion air thickens and its temperature increases. However, a disadvantage of this step is that it concerns a relatively inert system, which has fill differences in the combustion chambers of the individual cylinders.

A disadvantage of known procedures according to the state of the art is that the parameters for the controlled self-ignition, especially the gas temperature in the combustion chamber, allow themselves during the compression stroke to be insufficiently controlled by a closed or open-loop.

This problem is solved by a procedure to operate an internal combustion engine, especially a gasoline engine with direct gasoline injection, in a controlled self-ignition, whereby the internal combustion engine comprises a combustion chamber, at least one intake valve and at least one exhaust valve, whose opening times are changeable, whereby the engine comprises as well a closed-loop controllable exhaust gas recirculation, whereby a mixture capable of ignition contains the residual gas and in the combustion chamber, a compression stroke compresses the mixture so that the gas mixture self-ignites toward the end of the compression stroke, whereby the residual gas moves into the combustion chamber, respectively stays there, by means of internal and external exhaust gas recirculation. The mixture capable of ignition is normally a fuel-residual gas-air-mixture. The changeability of the opening times of the intake valve and the exhaust valve are especially made possible by means of a so-called electrohydraulic valve control (EHVS). Other adjustments of the valve control times are also possible here, for example, by means of adjustable camshafts. Residual gas is understood here as gas which remains in the combustion chamber from a preceding work cycle, respectively is transported back into the combustion chamber. It, thus, concerns a combusted fuel-air-mixture. Provision is preferably made for the temperature of the gas mixture to be controlled by the proportions of residual gas from external and those from internal exhaust gas recirculation of the complete exhaust gas recirculation. The residual gas from internal exhaust gas recirculation is as a rule significantly hotter that the residual gas from external exhaust gas recirculation. By means of an appropriate mixture of both residual gases, the temperature can be controlled over wide ranges. With the aid of this control, an optimal temperature of the gas mixture is adjusted for the controlled self-ignition in the combustion chamber during the compression stroke. At the same time, provision is preferably made for a base rate of the exhaust gas recirculation provided by the external exhaust gas recirculation, which remains unchanged for more than one work cycle. The base rate is only gradually changed. The process concerns an inert closed-loop control of the temperature of the gas mixture in the combustion chamber. Preferably provision is additionally made to add an auxiliary rate of residual gas to the base rate from the internal exhaust gas recirculation. The auxiliary rate is quickly adjustable and for this reason can be preferably cycle-true controlled. Cycle-true implies that a different rate of residual gas is adjusted to each work cycle.

The problem mentioned at the beginning of the application is also solved by a control device for an internal combustion engine, especially a gasoline engine with direct gasoline injection, whereby the internal combustion engine comprises a combustion chamber, at least one intake valve and at least one exhaust valve, whose opening times are variable as well as an adjustable exhaust gas recirculation and a gas mixture capable of ignition, which contains residual gas. In the combustion chamber of the engine, compression takes place during a compression stroke, whereby the gas mixture self-ignites toward the end of the compression stroke, whereby the residual gas enters the combustion chamber, respectively stays there, by means of internal and external exhaust gas recirculation.

Subsequently an example of embodiment of the invention at hand is explained in detail using the accompanying drawings. Thereby the following is shown:

SHORT DESCRIPTION OF THE DRAWINGS

Figure 2:
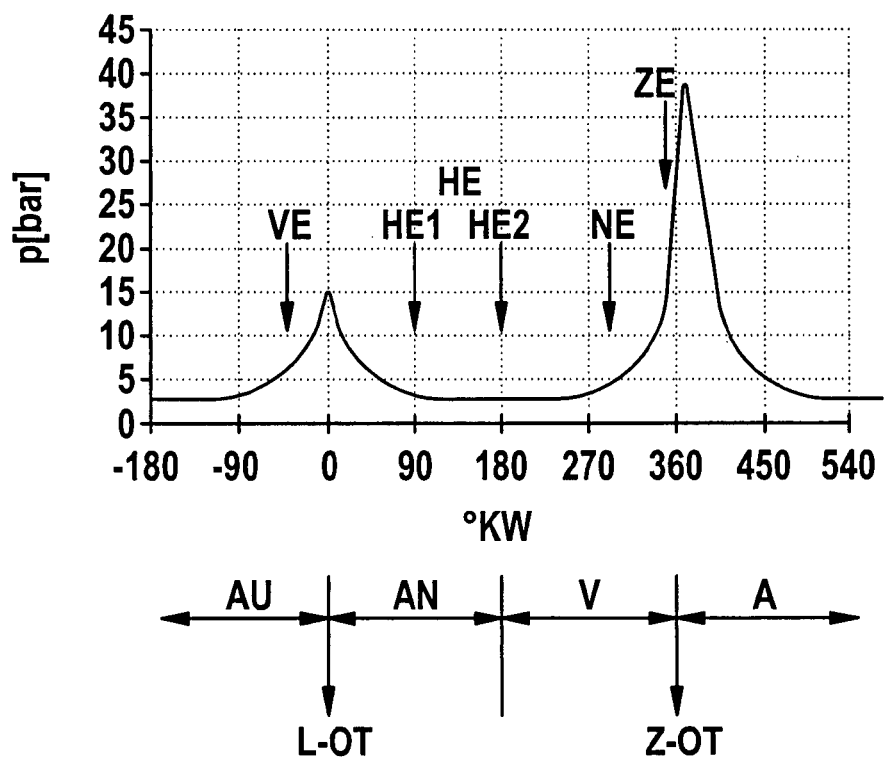
Figure 4:
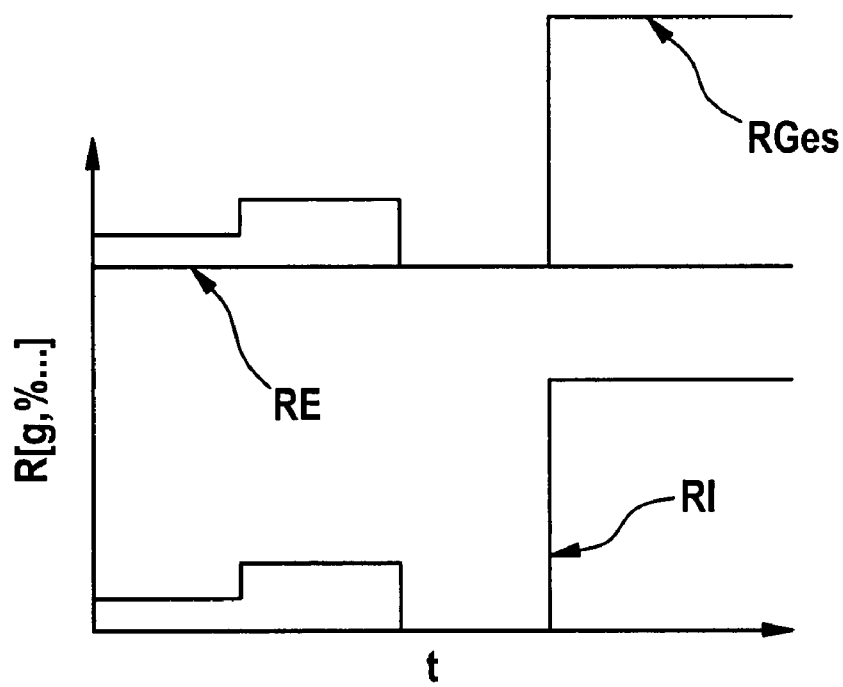

FIG. 1 an outline of a cylinder of an internal combustion engine;

FIG. 2 a diagram of the combustion chamber pressure plotted against the crankshaft angle;

FIG. 3 opening and closing times of the charge-cycle valves;

FIG. 4 residual gas proportions from the inner and outer exhaust gas recirculation plotted against the time.

Using FIG. 1 the technological layout of the invention is initially described. A cylinder 1 is depicted of an otherwise unspecified internal combustion engine, which as a rule consists of several cylinders. The cylinder 1 comprises a combustion chamber 2, in which a piston 3 with a connecting rod 4 is disposed with the ability to travel. The connecting rod 4 is connected to an unspecified crankshaft. An inlet leads into a combustion chamber 2 with an intake valve. Furthermore, an outlet 7 leads into the combustion chamber 2 with an exhaust valve AV. The intake valve EV as well as the exhaust valve AV are activated electrohydraulically. Hence, the internal combustion engine is equipped with a so-called electrohydraulic valve control (EHVS). An electrohydraulic valve control allows for an activation of the valves independent of the crankshaft position. By way of the inlet 5, ambient air is taken into the combustion chamber 2. The combustion exhaust gases are given off again to the surrounding environment by way of the outlet 7. An exhaust gas recirculation 9 with a control valve allows for a recirculation of the exhaust gases out of the outlet 7 back to the inlet 5. Such a recirculation is denoted as an outer exhaust gas recirculation. By means of a suitable opening time of the exhaust valve AV, for example, an opening of the exhaust valve AV during the intake stroke of the internal combustion engine, a so-called inner exhaust gas recirculation can be implemented, in which in fact during the intake stroke of cylinder 1, exhaust gas flows back out of the outlet 7 into the combustion chamber, respectively is drawn back into the chamber.

A spark plug 11 as well as an injector 12 lead into the combustion chamber in a known manner. The injector 12 is preferably a piezoelectric injector of an electrohydraulic injector. The injector 12 is connected by way of a high pressure line 13 with a non-depicted high pressure rail of the internal combustion engine. The high pressure line 13 delivers fuel to the injector 12. The injector 12 is electrically activated by a control unit 14, correspondingly the spark plug 11 as well as the intake valve EV and the exhaust valve AV are controlled by the control unit 14. Instead of one intake valve EV and one exhaust valve AV, provision can also be made here for several intake valves EV and several exhaust valves AV.

In electrohydraulic valve control systems without camshafts (EHVS), as they, for example, are known from the German patent DE 10127205 and the German patent DE 10134644, lift and control times of the charge-cycle valves of an internal combustion engine are fundamentally freely programmed. The charge-cycle valves are in this case the intake valve EV and the exhaust valve AV.

FIG. 2 shows a diagram of combustion chamber pressure in the combustion chamber 2 of the internal combustion engine plotted against the crankshaft angle in degrees of the crankshaft (° KW). A crankshaft angle from −180° to 540° is depicted above the ordinate, and above the abscissa the combustion chamber pressure is plotted in bar. With 0° the top dead center in the charge-cycle L-OT is arbitrarily selected. The charge-cycle serves in a known manner the discharge of combusted exhaust gases. This discharge takes place between −180° and 0 of the crankshaft angle. The charge-cycle also serves the intake of fresh ambient air, respectively a fuel-air-mixture, which takes place in the crankshaft angle range of 0-180°. Top dead center of the ignition (ignition-TDC) is achieved one crankshaft rotation further at 360° of crankshaft rotation. Between 180° of the crankshaft angle and 360° of the crankshaft angle, the compression stroke takes place. Between 360° of the crankshaft angle and 540° of the crankshaft angle the expansion of the combusting gases takes place. The individual strokes are denoted in FIG. 2 with discharge AU from −180° to 0°, intake AN from 0° to 180°, compression stroke (compression) V from 180° to 360° and expansion (combustion) E from 360° to 540°. During the compression stroke, the air, respectively fuel-air-mixture or fuel-air-exhaust gas-mixture is compressed and thereby heated up. The mixture is ignited as a rule shortly before reaching the ignition's top dead center. This can usually result in a gasoline engine by means of an externally-supplied ignition or by means of a controlled self-ignition in accordance with the mode of operation according to the invention. The ignition of the mixture leads in a known manner to an increase in pressure, which is converted into mechanical energy in the subsequently occurring working stroke of expansion E.

In FIG. 3 the opening and closing respectively of the intake valve IV as well as the exhaust valve EV are depicted. The exhaust valve EV is opened as is usual in a 4-stroke-engine in the discharge stroke between −180° to 0° of the crankshaft angle.

Correspondingly the intake valve IV is opened in the range of the intake stroke between 0° of the crankshaft angle and 180° of the crankshaft angle. Four cases are depicted in FIG. 3, which in each case represent different valve opening strategies. The usual valve opening strategy is depicted in FIG. 3.1, during which the exhaust valve EV is opened shortly before reaching bottom dead center and remains open approximately to −90° of the crankshaft angle. In so doing, a portion of the combusted exhaust gases remain in the combustion chamber 26. The intake valve IV is first opened at approximately 90° of the crankshaft angle as soon as pressure equalization exists between the combustion chamber 26 and the intake duct and remains open approximately up to reaching bottom dead center. In this manner a so-called valve overlap is produced, which thereby causes a portion of the combusted exhaust gases to remain in the combustion chamber 26 and serves to heat the fuel-air-mixture in the intake duct, which is subsequently brought into the combustion chamber. In this manner a fuel-air-exhaust gas mixture is produced in the combustion chamber 26.

FIG. 3.2 shows an alternative activation strategy for the intake and exhaust valves. In this case the exhaust valve EV remains open between bottom dead center UT and top dead center OT. The intake valve correspondingly remains open between top dead center and bottom dead center. A very short valve overlap takes place in the area of top dead center. During the opening of the intake valve IV, the exhaust valve EV is additionally open in the range of approximately 90° of the crankshaft angle until shortly before reaching bottom dead center UT. Thus, in this range, the intake valve as well as the exhaust valve are open, so that a portion of the discharged exhaust gases are transported back into the combustion chamber by way of the exhaust valve.

An additional valve control strategy is depicted in FIG. 3.3, in which the exhaust valve EV remains open between bottom dead center UT and top dead center OT until approximately bottom dead center is reached at an approximate crankshaft angle of 180°. Additionally the intake valve IV is open approximately between 90° of the crankshaft angle and bottom dead center UT at 180° of the crankshaft angle. Thereby combusted exhaust gas is discharged from the combustion chamber 26; and then between 0° of the crankshaft angle and the closing of the exhaust valve EV and in this instance at approximately 120° of the crankshaft angle, it is again drawn into the combustion chamber 26 out of the exhaust gas system. The intake valve IV is open at this point between approximately 90° of the crankshaft angle and the reaching of bottom dead center at 180° of the crankshaft angle, so that fresh air can be drawn into the combustion chamber during this time. Also in this instance an overlapping of the valves occurs, specifically here approximately between 90° of the crankshaft angle and 120° of the crankshaft angle.

FIG. 3.4 shows an additional variation of the valve strategy, in which the exhaust valve EV is open between bottom dead center and −180° of the crankshaft angle and top dead center at 180° of the crankshaft angle. The intake valve IV is open approximately between −60° of the crankshaft angle above top dead center at 0° of the crankshaft angle up to bottom dead center at 180° of the crankshaft angle. Hence, a valve overlap occurs here approximately between −60° of the crankshaft angle and the reaching of top dead center at 0° of the crankshaft angle. Thereby a portion of the exhaust gas is pressed into the intake stroke and is transported back into the combustion chamber 26 during the opening time of the intake valve between top dead center at 0° of the crankshaft angle and bottom dead center at 180° of the crankshaft angle.

The valve control in the example of embodiment of FIG. 3.1 produces a hot amount of residual gas in the combustion chamber 26 and allows for a stratified fuel injection. This valve control strategy is therefore ideal for a stratification operation. In contrast the valve control depicted using FIG. 3.4 is connected with a warm amount of residual gas in the combustion chamber 26 and allows for a homogenous loading of the combustion chamber 26 and with it a homogenous operation of the internal combustion engine. The valve control corresponding to the examples of embodiment according to FIGS. 3.2 and 3.3 are in each case transitional solutions between the extremes depicted in FIGS. 3.1 and 3.4. At different load levels different valve and injection strategies are required. At very low loads, a high rate of residual gas is necessary in order to provide the required temperature for self-ignition. At this operating point the residual gas storage according to FIG. 3.1 is used in the combustion chamber 26, whereby the exhaust valve is closed significantly before top dead center of the charge-cycle. The compression of the residual gas mass located in the cylinder leads to an additional temperature increase. The injection results, as soon as the piston is located in the area of top dead center of the charge-cycle. Due to the high temperatures, decomposition reactions of the fuel into reactive byproducts occur, which significantly affect and in this instance reduce the self-ignition timing. The intake valve is opened, as soon as the pressure equalization prevails between the intake manifold and the combustion chamber in order to prevent losses of flow.

The danger exists in moving to higher loads, that the cylinder load ignites too early due to the high temperatures, and the subsequent very rapid combustion leads to knocking as small amounts of residual gas are present here. For that reason the positive valve overlap is used with the increasing load, as this is depicted in the examples of embodiment for valve control according to the FIGS. 3.2, 3.3 as well as 3.4. In so doing, the required amount of residual gas is drawn either from the exhaust gas port or the intake inlet port. The injection results then during the intake stroke, whereby the timing of the injection affects the homogeneity of the cylinder loading. Additionally the possibility exists, to set down an additional injection during the compression stroke. The evaporation enthalpy of the fuel causes a cooling of the cylinder load, which counteracts a self-ignition occurring too early and combustion with knocking. The injection during the compression stroke can also be combined with an injection into the compressed amount of residual gas, provided the valve control strategy or the residual gas storage according to FIG. 3.1 is used. In the same situation the combination of several injections starting in the range of the charge-cycle top dead center is possible via the intake stroke up into the compression stroke as is depicted in FIG. 3.

Through (partial) opening of the governor valve 10, the extreme exhaust gas circulation is implemented. The exhaust gas discharged into the exhaust outlet is recirculated to the intake inlet 5 by way of the exhaust gas recirculation 9 and the governor valve 10, which as a throttle valve can be brought into a desired intermediate position between a completely closed and a completely open position. Depending upon the opening of the governor valve 10, more or less exhaust gas is recirculated out of the exhaust outlet 7 to the intake inlet 5.

At different load levels of the internal combustion engine, different compositions and temperatures are needed at the point in time of intake closure of the intake valves for the self-ignited combustion process. Intake closure is the point in time, at which the intake valve 5 closes. At very low loads a high rate of residual gas is necessary, in order to provide the required self-ignition temperature. Fresh gas is understood as the (fresh) ambient air drawn from the surrounding environment. Residual gas is understood as the combusted fuel-air mixture brought back to the combustion chamber 2 and remaining there by means of internal or external exhaust gas recirculation. The residual gas rate is the proportion of the exhaust gas, which is recirculated into the combustion chamber 2, respectively remaining in the chamber, by means of internal or external exhaust gas recirculation. Thus, three fundamental residual gas control strategies result:

1. a pure external residual gas control by means of external exhaust gas recirculation, which can be cooled (conditioned) by closed-loop control;
2. a pure internal residual gas control by means of the internal exhaust gas recirculation using variable valve actuation (negative or positive valve overlap); double opening of intake and/or exhaust valves and the like;
3. a mixture of internal and external residual gas control.

The external conditioned exhaust gas recirculation according to fundamental residual gas control strategy 1. allows a gradual but well defined residual gas metering in regard to the temperature and the amount of the residual gas. In so doing, pressure and temperature sensors are required in the exhaust outlet in the intake inlet 7. These temperature and pressure sensors are not depicted in FIG. 1. These can, for example, be disposed in the exhaust outlet in front of and behind the juncture to the exhaust gas recirculation 9.

The external exhaust gas recirculation is very well homogenized; hence, a homogenous, thoroughly mixed mixture of residual gas and fresh gas are received in the combustion chamber 2.

In the cycle-true internal residual gas control according to fundamental residual gas control strategy 2., the metering of the amount of residual gas is very exact because it can be metered exactly via the exact controllable opening times of the exhaust valve 8. The temperature is very high, as few heat losses are generated. The temperature can be varied, in that different valve strategies are driven, as, for example, negative valve overlaps (This results in the highest temperature.) or positive valve overlaps with or without doubled opening of the intake and/or exhaust valve, which results in a somewhat lower temperature than with the negative valve overlap.

The mixed residual gas strategy according to fundamental residual gas control strategy 3., consequently a combination from internal and external exhaust gas recirculation, offers the possibility to control the mixture temperature very exactly. In so doing, there is on the one hand the relatively gradually controllable path of the external, cooler residual gas control, which represents a basis-exhaust gas recirculation; and on the other hand, there is the (cycle-true) internal residual gas metering for a more precise (more rapid) closed-loop control of the combustion process. For this reason, by way of an exhaust gas recirculation 9, more exactly stated by way of the position of the governor valve 10, an exhaust gas recirculation is set, which by means of the internal recirculation is "modulated". The external exhaust gas recirculation behaves at the same time relatively inert with regard to changes of the valve position of the governor valve 10. For this reason, the external exhaust gas recirculation is maintained constant as much as possible over several work cycles of the cylinder 1. With the aid of external exhaust gas recirculation by way of the exhaust gas recirculation 9, a base rate $R_E$ according to FIG. 4 is generated. Via the internal exhaust gas circulation, as this is depicted in FIG. 3, an auxiliary rate of residual gas is now recirculated. Thereby a precise closed-loop control of the exhaust gas recirculation is conducted. By variation of the amount of residual gas $R_I$ coming from the internal gas recirculation and of the amount of residual gas $R_E$ coming from the external gas recirculation, especially the temperature of the residual gas-air-fuel mixture can be set in the combustion chamber 2. This is depicted in FIG. 4 as an example for two cases. The amount of residual gas is plotted in FIG. 4. This can be indicated as a mass specification or as a percent specification of the mass, respectively of the volume in the combustion chamber, as a function of the time t. An amount of residual gas $R_E$ is transported back by the exhaust gas recirculation, which is essentially maintained constant as a function of the time. Of course, a change in the amount of residual gas results via the closed-loop control of the exhaust gas recirculation. An inert closed-loop control is, however, of concern here, which, therefore, only intervenes to adjust, for example, to different load ratios. Additionally an internal exhaust gas recirculation $R_I$ takes place, which is relatively rapidly adjusted. In this instance, a different amount of residual gas can be adjusted for every working stroke. The external exhaust gas recirculation $R_E$ and the internal exhaust gas recirculation $R_I$ produce together the complete exhaust gas recirculation $R_{GES}$.

By way of the ratio of the internal exhaust gas recirculation $R_I$ and the external exhaust gas recirculation $R_E$, the temperature of the residual gas-air-mixture in the combustion chamber 2 can additionally be set. The higher the proportion of residual gas from the internal exhaust gas recirculation, the higher the temperature is of the residual gas-air mixture during the compression stroke in the combustion chamber 2.

The invention claimed is:

1. A method of operating an internal combustion engine, especially a gasoline engine with direct gasoline injection, in a controlled self-ignition, whereby the internal combustion engine includes a combustion chamber, at least one intake valve and at least one exhaust valve, whose opening times are changeable, an adjustable exhaust gas recirculation, and a gas mixture capable of ignition, which contains residual gas, which is compressed in the combustion chamber during a compression stroke, whereby the gas mixture self-ignites toward the end of the compression stroke, the method comprising moving the residual gas into the combustion chamber by using internal and external exhaust gas recirculation, wherein a base rate of the exhaust gas recirculation is provided by the external exhaust gas recirculation, which remains unchanged for more than one working cycle, wherein an auxiliary rate of residual gas is added to the base rate from the internal exhaust gas recirculation.

2. A method according to claim 1, further comprising controlling a temperature of the gas mixture by proportions of residual gas from the external exhaust gas recirculation and of residual gas from the internal exhaust gas recirculation of the exhaust gas recirculation.

3. A method according to claim 1, wherein the auxiliary rate is cycle-true controlled.

4. A control device for an internal combustion engine, especially a gasoline engine with direct gasoline injection, whereby the internal combustion engine includes a combustion chamber, at least one intake valve and at least one exhaust valve, whose opening times are changeable, an adjustable exhaust gas recirculation and a gas mixture capable of ignition, which contains residual gas, which is compressed in the combustion chamber during a compression stroke, whereby the gas mixture self-ignites toward the end of the compression stroke, the control device causing residual gas to move into, and respectively remain in, the combustion chamber by way of internal and external exhaust gas recirculation, wherein a base rate of the exhaust gas recirculation is provided by the external exhaust gas recirculation, which remains unchanged for more than one working cycle, wherein an auxiliary rate of residual gas is added to the base rate from the internal exhaust gas recirculation.

* * * * *